(12) United States Patent
Cordell et al.

(10) Patent No.: US 8,582,742 B1
(45) Date of Patent: Nov. 12, 2013

(54) PERFORMING AUTOMATED EVENT SERVICES TO REGISTERED END USERS

(75) Inventors: Jeffrey William Cordell, Omaha, NE (US); Michael T. Mateer, Omaha, NE (US); Chad David Hendren, Missouri Valley, IA (US)

(73) Assignee: West Corporation, Omaha, NE (US)

( * ) Notice: Subject to any disclaimer, the term of this patent is extended or adjusted under 35 U.S.C. 154(b) by 540 days.

(21) Appl. No.: 12/433,985

(22) Filed: May 1, 2009

(51) Int. Cl.
*H04M 3/42* (2006.01)

(52) U.S. Cl.
USPC .................................. 379/202.01; 379/93.21

(58) Field of Classification Search
USPC .................... 379/93.21, 158, 202.01, 203.01, 379/204.01, 205.01
See application file for complete search history.

(56) References Cited

U.S. PATENT DOCUMENTS

| | | | |
|---|---|---|---|
| 5,483,587 A * | 1/1996 | Hogan et al. | 379/202.01 |
| 7,120,234 B1 * | 10/2006 | Quinn et al. | 379/88.04 |
| 2003/0035381 A1 * | 2/2003 | Chen et al. | 370/261 |
| 2003/0185369 A1 * | 10/2003 | Oliver et al. | 379/202.01 |
| 2004/0125933 A1 * | 7/2004 | Jun et al. | 379/202.01 |
| 2005/0152523 A1 * | 7/2005 | Fellenstein et al. | 379/202.01 |
| 2005/0276406 A1 * | 12/2005 | Keohane et al. | 379/202.01 |
| 2011/0182212 A1 * | 7/2011 | Smelyansky et al. | 370/260 |

* cited by examiner

*Primary Examiner* — Olisa Anwah

(57) ABSTRACT

A method and apparatus of providing event data to end users is enclosed. The operations included may provide notifying end users of an event by communicating a notification message to the end users, and receiving event registration messages from at least a portion of the end users to register the end users for the event. The apparatus may also include storing the event registration messages in a registration list file, and establishing a connection for each of the portion of the plurality of end users via an interactive voice response (IVR) application. The IVR application is then dropped and the connection is maintained via a port on a network element to transfer the event data from the network element to the portion of the registered end users.

20 Claims, 3 Drawing Sheets

PERFORMING AUTOMATED EVENT SERVICES TO REGISTERED END USERS

TECHNICAL FIELD OF THE INVENTION

The present invention is generally related to automated registered event notification and reminder notification to end users using a telecommunications switch to provide event services to individual end users.

BACKGROUND OF THE INVENTION

There has been an increase in recent years of the availability of public digital grade networks, such as the World Wide Web ("WWW") and the Internet, to exchange voice communication signaling. Conventional, voice and media data exchange platforms are performed via an individual dialer device that dials out to an end user that is pre-registered to receive a broadcast event. For example, if an end user registers for a town hall meeting to be broadcast at a later time, then prior to the town hall meeting, the end user device (i.e., mobile terminal) would need to be dialed-up directly and would also need to keep her own line open from a single dialer device.

It would be optimal if multiple remote end users communicating through computer voice functionality over, for example, the Internet, could be dialed up to receive access to a "town hall" meeting by communicating through standard telephony links, such as, the public switched telephone network (PSTN). In addition, it would be further optimal to reduce the charges that are incurred from interactive voice response (IVR) services and to utilize telecommunications ports of standard PSTN connections to provide broadcasting for "town hall" events to all pre-registered end users.

SUMMARY OF THE INVENTION

The present invention provides a system, method, and computer readable medium of providing an automated registered event notification and reminder notification to end users using a telecommunications switch to provide event services to individual end users.

An example embodiment of the present invention may include a method of providing event data to end users. The method may include notifying a plurality of end users of an event by communicating a notification message to the plurality of end users. The method may also include receiving event registration messages from at least a portion of the plurality of end users to register said portion of the plurality of end users for the event, and storing the event registration messages in a registration list file. The method may further include establishing a connection for each of said portion of the plurality of end users via an interactive voice response (IVR) application, and dropping the IVR application and maintaining the connection via a port on a network element to transfer the event data from the network element to said portion of the plurality of registered end users.

Another example embodiment of the present invention may include an apparatus configured to provide event data to end users. The apparatus may include a transmitter configured to notify a plurality of end users of an event by communicating a notification message to the plurality of end users. The apparatus may also include a receiver configured to receive event registration messages from at least a portion of the plurality of end users to register said portion of the plurality of end users for the event, and a memory configured to store the event registration messages in a registration list file.

The apparatus may further include a processor configured to establish a connection for each of said portion of the plurality of end users via an interactive voice response (IVR) application, and to drop the IVR application and maintaining the connection via a port on a apparatus to transfer the event data from the apparatus to said portion of the plurality of registered end users.

DETAILED DESCRIPTION

Figure 1:
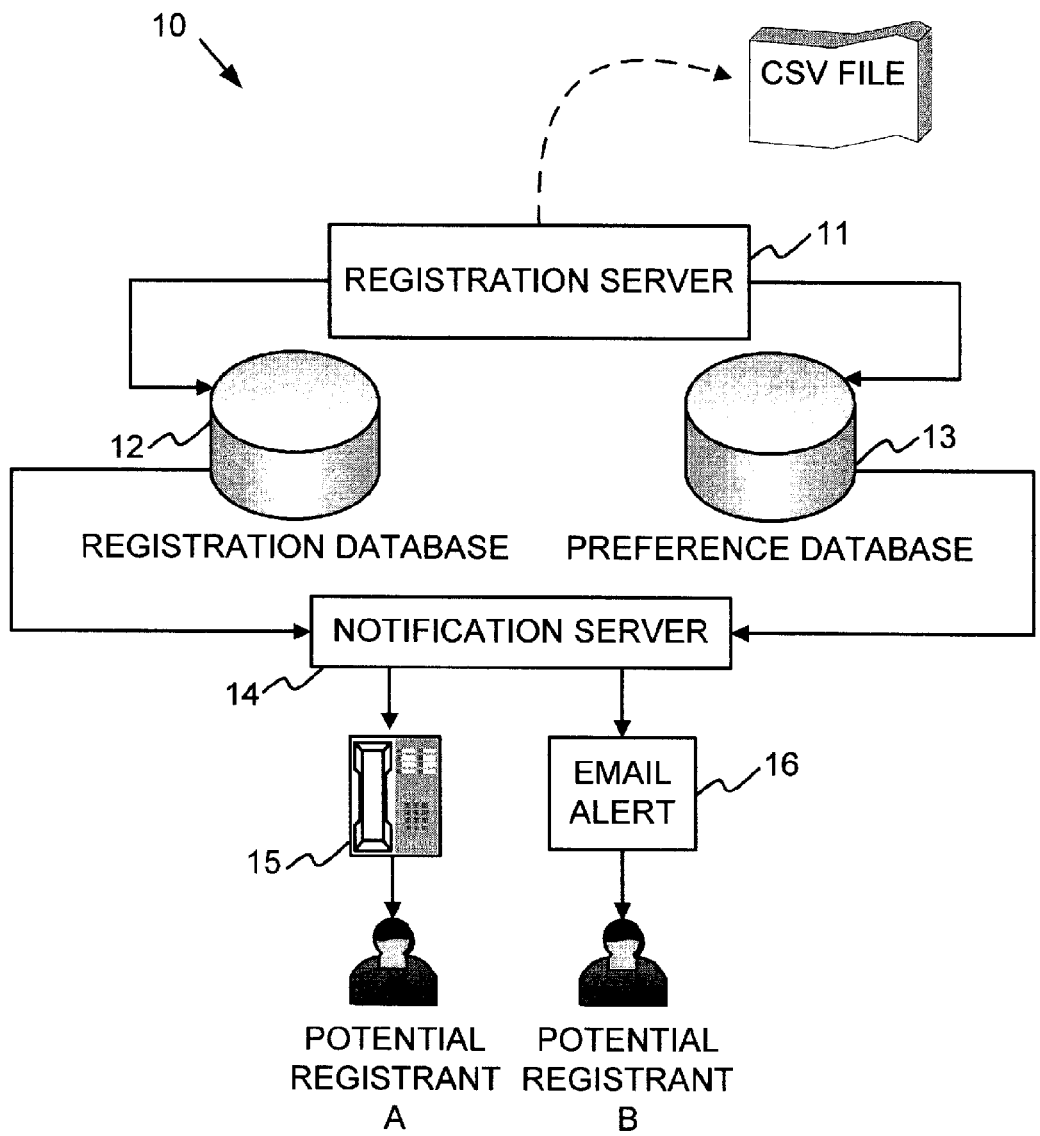
FIG. 1 illustrates a network configuration of registering customers for events.

FIG. 1 illustrates a registration networking system 10 that provides a registration and list generation process according to an example embodiment of the present inventive concept. Referring to FIG. 1, the networking registration system includes a registration server 11, a registration database 12, a preference database 13, a notification server 14, a telephone calling device 15, and an email or other electronic notification alerting device 16. The networking system 10 provides a registration procedure to register potential registrants for upcoming events, such as, for example, town hall meetings, telecasts, broadcasts, and other audio and/or video data events.

In operation, the notification server may initiate a notification message to potential registrants "A" and "B" who are pre-registered in the registration database 12 to receive pre-event registration reminders of upcoming events. The potential registrants may read or listen to information regarding the event and decide whether the event is something that they would like to be registered for when the event take place in the near future.

The potential registrants "A" and "B" may receive the event registration information via e-mail, auto-dialer telephony sub-systems, which dial the user's telephone number and offer information upon the user's answering of the call. Other event registration information notifications may include text messaging and/or any other computer or cell-phone based notification tool available to the registrants.

In one example, an event may be solicited to potential registrants in the form of a voice mail with a web link embedded in the voice and/or in an accompanying e-mail. For example, a town hall mayor may leave a voice message to the potential registrants as a welcome to listen in on the event, but, may also include a web link "www.clickherefortownhallmeeting.com" as a click only tool to access and register for the event.

Upon receiving the event registration information, the potential registrants "A" and/or "B" will either elect to be included in the upcoming event or to decline participation in the upcoming event. Assuming registrant "A" elects to be part of the event, the registrant "A" may also elect certain profile-related options which include preferences for receiving the event data in a particular manner and may also include preferences for the way the event data is offered. For example, registrant "A" may elect to participate in the event via her cell phone. The call may be received at the user's cell phone number and may include audio but not video because the user may wish to save money on expensive high bandwidth video data by only listening to the audio and not watching the video portion that is otherwise available.

Once the registrant's preferences are known, those preferences may be stored in the preference database 13 so that the registrant's preferences may be recalled at a later time (i.e., when a registered event is about to take place). The registration database 12 will store other registrant user information, such as, user name, telephone number, location, request for reminder, automated call-to-join event feature enablement and other user related information.

The registration database 12 will also provide a list of the pre-registered registrants who should be contacted for a particular event. In addition, the types of events may be further matched to meet the registrants' preferences and profile information (i.e., a registrant with a lawyer occupation may be profiled for recent Supreme Court decisions broadcast as upcoming events).

Once the registration procedure is completed and a list of potential registrants, their event preferences, and their respective identification information has been obtained, the information may be stored in a data file or basic comma-separated-value (CSV) data file. The CSV file may, in turn, be forwarded to a file transfer protocol (FTP) website that uploads the information into an online database system of a notification networking system 20 of FIG. 2.

Figure 2:
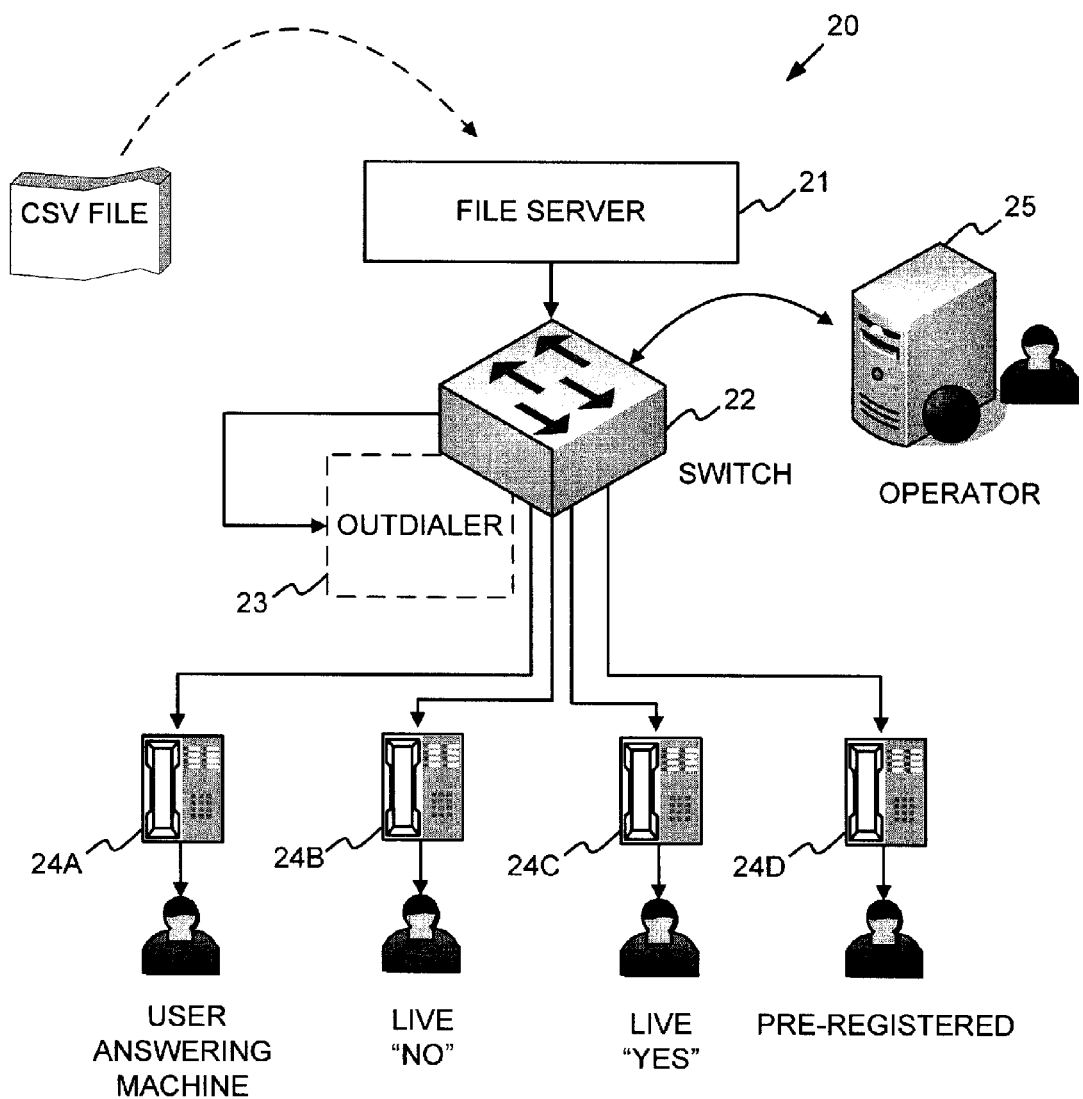
FIG. 2 illustrates a network configuration that continues from FIG. 1 and which provides reminders and event connection services to users.

Referring to FIG. 2, the notification networking system 20 includes a file server 21, a call and data handling network switch 22, an outdialer 23 and user registrants 24A-24D. Once the CSV file is received at the file server 21, the data entries in the CSV file must be processed and translated into notification entries for later processing of notifications.

The file server 21 may include a multi-channel network (MCN) application that provides notification handling based on the generated notifications. The MCN may also format the data of the event for delivery to the registered users. For example, the MCN may format VXML data for audio delivery across various different types of channels. The file server 21 may also include a business process application that manages the outdialing process and business related matters related to event notifications.

Once the MCN has formatted the delivery scheme for presenting event data to the registered users. A calling operation is forwarded from the switch 22 to the outdialer 23, which may be separate from the switch 22, or, instead, may be part of the switch as a virtual outdialer application module. The outdialer 23 will notify the switch 22 to perform calling operations to customer phones 24A-24D. For example, the outdialer can call the customers phones and will receive a response based on dual tone multi-frequency responses (DTMF) or via speech recognition. The speech recognition may be provided by attaching an automatic speech recognition (ASR) unit to the outdialer 23.

Referring to the customer phones 24A-24D, in a first scenario a customer's answering machine may answer the reminder for the event. In such a case, the outdialer may leave an automated pre-recorded voice message that the user of the answering machine 24A can listen to at a later time. For customer 24B, the automated reminder may connect to the customer 24B who responds to the event reminder by saying "NO." In this example, the customer has effectively made the decision not to connect to the event and will not be reminded of the same event again. In addition to receiving a call, reminders and event notifications in general may be provided by other automated communication mechanisms, such as, chat, instant messaging (IM), SMA, fax, etc., in addition to voice and email services.

Referring to customer 24C, conversely from the above-example of the user saying "NO", customer 24C may speak "YES" into the phone upon being called and reminded of the event. In such a case, customer 24C will have her call routed to join the event via a conference bridge service located at a third party facility.

In the last case, the customer 24D will be pre-registered to accept the event registration reminder by simply pressing "1" or another DTMF button on her phone to effectively accept participation in the event. In such a case, the customer 24D will have her call routed to a pre-registered automated service application that matches her telephone number via an automatic number identification (ANI) service. The ANI matching operation may be performed by matching the customer's number with preference and registration information pre-stored in a registration database or file.

Once a customer has accepted event registration, the call may be transferred to a pre-conference lobby that maintains the call connection until the event is ready to begin. Alternatively, the customer may be called back automatically at the time the event is ready to begin, which could save air time for a cellular phone service.

When calling the registered user, the present implementation may operate at the enterprise level to contact multiple end user customers (i.e., 100,000 registered users may be contacted to receive the town hall data feed and 10,000 may actually confirm attendance). There is no need for a single dialer to perform the calling of each of the registered users. Instead, it is possible to dial-out to all of the registered users at the time of the event, and use a media gateway or switch 22 to hold the lines open using a standard telecommunications (i.e., PSTN) resource platform.

By holding the lines open using the PSTN, there is no need to bridge in order to hold the lines open. By avoiding the bridge requirements, it is possible to perform a town hall broadcast via the switch 22 based on simply a PSTN port charge. By using a PSTN port to perform the town hall broadcast, it is possible to minimize expensive interactive voice response (IVR) server charges for each of the individual customers. This way, the customers receive an IVR-type service without additional IVR-based charges.

The entire process of broadcasting a town hall meeting to a large number of registered customers may be entirely automated. For example, by using the event registration platform, end users may register weeks ahead of time (i.e. product release, etc.) and may be notified right before the call is going to begin and then may be joined into the call without having to set it up ahead of time.

The switch 22 provides a call transferring service that either provides a conference call bridge, or, instead, connects the call without using a bridge. In the no bridge scenario, the switch 22 will maintain the caller leg and add the leg to a bridge but will drop the voice dialer 23 function and permit a next call function via a call detail record. Once the IVR leg has been established as a connection via an IVR outdial port, the called user may be transferred to the event conference automatically, or, at least transferred to an operator 25, where the user may receive additional assistance.

During the IVR outdial port initial calling procedure, the user is called and asked if she wants to join the conference event. The user, although already registered, may then decide if the conference event is still appropriate at that current time. The user may confirm that she wants to continue with participating in the conference event by pressing a key or selecting an option to confirm attendance via the user handset device.

Once the user's confirmation to join the conference event is received, the user may be transferred into the conference event automatically without further delay. Alternatively, the user may confirm and/or request to be transferred to an operator 25 directly to receive further assistance. The operator 25 may provide user assistance by guiding the user with detailed instructions to join the conference, or, instead, to join the conference based on further user requirements of options available to the user.

After the user joins and the confirmation has been received by the operator 25 and/or the user, the IVR port that was used to provide the conference event feed may be released since the call connection is established for that particular user (i.e., the call was handed-off). This provides the conference event service with the availability to provide a next user with an opportunity to join the conference event instead of being tied-up with a single caller.

The switch 22 establishes the legs for the confirmed users 24C and 24D. After registration is performed, the IVR leg is dropped and the call is held by the switch 22. This configuration essentially places and maintains the leg in the conference bridge. There may be two legs for each user, the leg that goes into the bridge function of the switch 22 and the leg that comes out of the bridge function.

In the case where the customer is pre-registered for the conference, there is no need to further screen the user. In other words, the automated ANI entry matching of the customer number to a pre-registered database will connect the customer automatically to the event.

The operator 25 may be an automated server computer including a computer readable medium for providing an automated software program function. The operator 25 may instead require an administrator to provide various management functions. Examples of the management functions may include archived playback services, operator services, pre-registered ANI matching services and may also include an event moderator bridge function.

The event moderator bridge function may include conference moderation, conference question and answering, conference head-counting, conference notification delivery, conference notification call and throttling support, a trunk group port monitor and a stream participant count. For example, Most of these functions are self-explanatory, as for throttling support, the operator 25 may throttle back the rate of calls outstanding and the rate of simultaneous calls outstanding in order to manage ports. For instance, given a current number of calls outstanding, it may be necessary to borrow ports and/or prioritize ports to accommodate each of the outstanding participants.

In another example of throttling, outdial throttling may be performed to hold back a number of calls based on the size of the queue for certain types of calls. In operation, a user can be inserted into the call or to an operator automatically without any assistance. In another example, outdial throttling may be performed to modify the port transfer rate so that the optimal bandwidth is used to transfer data on the designated port. If the maximum number of ports are reached for the service capability of the switch 22, the operator 25 may provide a message to the users to access a URL for the same information during or after the call itself. This provides an alternative site that may be accessed by the users to receive the call.

Other features may include using capture registration information to invite users in to pre-register for an event. A leader-view monitor may also be used to determine who will set up the calls to get into the conference to ensure that there is no overbooking.

When a registered user connects to the conference when no operator is present, the registered user connects based on their ANI information. The ANI information may also be used to map the user's personal information to their ANI. In this example, if a registered user is participating in the town hall meeting then that person may push a button on their handset to ask a question and may have their name presented based the mapping between their ANI and their personal information. The ANI provides a way to keep track of the user's personal information and to refer to it when necessary.

Figure 3:
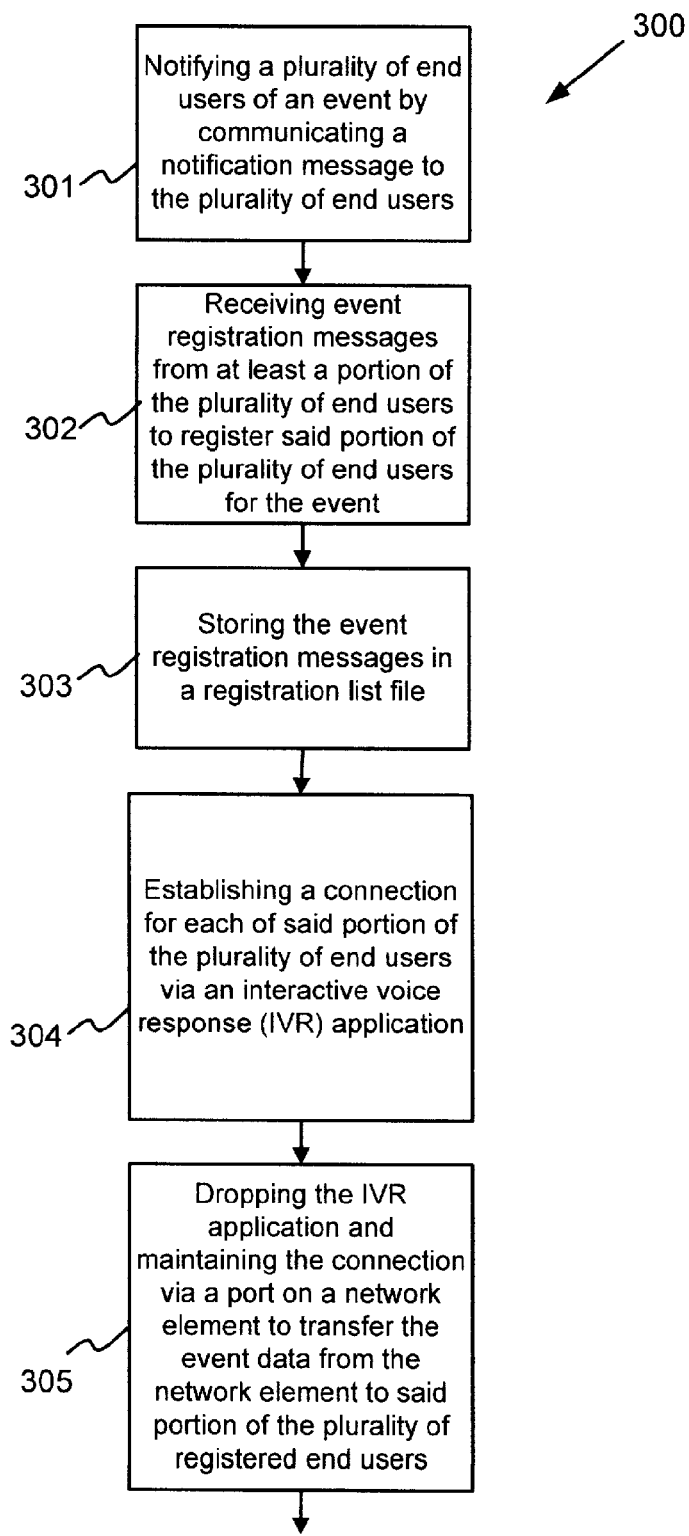
FIG. 3 illustrates an example method according to an example embodiment of the present invention.

An example method 300 according to an embodiment of the present invention is illustrated in FIG. 3. The method may include notifying a plurality of end users of an event by communicating a notification message to the plurality of end users at operation 301. The method may also include receiving event registration messages from at least a portion of the plurality of end users to register said portion of the plurality of end users for the event at operation 302 and storing the event registration messages in a registration list file at operation 303. Other operations may include establishing a connection for each of said portion of the plurality of end users via an interactive voice response (IVR) application at operation 304 and dropping the IVR application and maintaining the connection via a port on a network element to transfer the event data from the network element to said portion of the plurality of registered end users at operation 305.

The present inventive concept is preferably realized in a hardware device, such as, a computer, cellular phone, or other mobile terminal device etc. In other embodiments, the present invention may be realized in hardware, software, firmware or a combination of hardware, software and/or firmware.

The above example embodiments may also be implemented in software code and may be stored on a computer readable medium, such as, for example, non-volatile memory devices (e.g., RAM, ROM, hard disk etc.). The software code may be accessed from the computer readable medium and may be executed by a processor. The executed program may provide one or more of the features of the example embodiments.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of providing event data to end users, the method comprising:
   notifying a plurality of end users of an event by communicating a notification message to the plurality of end users;
   receiving event registration messages from at least a portion of the plurality of end users to register said portion of the plurality of end users for the event;
   storing the event registration messages in a registration list file, the event registration messages comprising at least identification information and preference information for each of the portion of the plurality of end users;
   establishing a connection for the event for each of said portion of the plurality of end users based on the preference information for each of the portion of the plurality of end users via an interactive voice response (IVR) application;

dropping the IVR application and maintaining the connection via a port on a network element to transfer the event data from the network element to said portion of the plurality of registered end users; and transmitting a message to said at least a portion the plurality of end users to access a uniform resource locator (URL) link to access the event data at least one of during and after the event when a maximum number of ports are reached for a service capability of the network element used to share the event data with the end users.

2. The method of claim 1, further comprising:
sending a list file to the network element that provides an automated call reminder application to said portion of the plurality of registered end users prior to the event beginning.

3. The method of claim 1, further comprising:
sending a reminder to said portion of the plurality of registered end users who are included on the list file to determine whether the users still wish to participate in the event; and
receiving confirmation message from at least a portion of said portion of the plurality of registered end users.

4. The method of claim 3, wherein the confirmation messages may be sent via at least one of a voice command from the end user's communication device and a web link confirmation from the end user's communication device.

5. The method of claim 1, wherein the maintained connection via a port on the network element includes at least two communication legs being maintained per user connected to the event.

6. The method of claim 1, wherein the network element is a switch.

7. The method of claim 1, wherein the network element is a gateway.

8. The method of claim 6, wherein the switch establishes a connection to at least one user by providing a bridge application that provides the user with an interactive voice communication capability to speak and to be heard by the other participants in the event.

9. The method of claim 1, wherein the registration message comprises at least one user name and user contact information.

10. The method of claim 1, wherein notifying is performed by at least one of email and a phone call.

11. An apparatus configured to provide event data to end users, the apparatus comprising:
a transmitter configured to notify a plurality of end users of an event by communicating a notification message to the plurality of end users;
a receiver configured to receive event registration messages from at least a portion of the plurality of end users to register said portion of the plurality of end users for the event;
a memory configured to store the event registration messages in a registration list file, the event registration messages comprising at least identification information and preference information for each of the portion of the plurality of end users; and
a processor configured to establish a connection for the event for each of said portion of the plurality of end users via an interactive voice response (IVR) application based on the preference information for each of the portion of the plurality of end users, and to drop the IVR application and maintaining the connection via a port on a apparatus to transfer the event data from the apparatus to said portion of the plurality of registered end users, and wherein the transmitter is configured to transmit a message to said at least a portion the plurality of end users to access a uniform resource locator (URL) link to access the event data at least one of during and after the event when a maximum number of ports are reached for the service capability of a network element used to share the event data with the end users.

12. The apparatus of claim 11, wherein the transmitter is further configured to send the list file to the apparatus that provides an automated call reminder application to said portion of the plurality of registered end users prior to the event beginning.

13. The apparatus of claim 11, wherein the transmitter is further configured to send a reminder to said portion of the plurality of registered end users who are included on the list file to determine whether the users still wish to participate in the event, and the receiver is further configured to receive confirmation message from at least a portion of said portion of the plurality of registered end users.

14. The apparatus of claim 13, wherein the confirmation messages may be sent via at least one of a voice command from the end user's communication device and a web link confirmation from the end user's communication device.

15. The apparatus of claim 11, wherein the maintained connection via a port on the apparatus includes at least two communication legs being maintained per user connected to the event.

16. The apparatus of claim 11, wherein the apparatus is a switch.

17. The apparatus of claim 11, wherein the apparatus is a gateway.

18. The apparatus of claim 16, wherein the switch establishes a connection to at least one user by providing a bridge application that provides the user with an interactive voice communication capability to speak and to be heard by the other participants in the event.

19. The apparatus of claim 1, wherein the registration message comprises at least one user name and user contact information.

20. A non-transitory computer readable medium including a computer program that when executed controls a processor to perform:
notifying a plurality of end users of an event by communicating a notification message to the plurality of end users;
receiving event registration messages from at least a portion of the plurality of end users to register said portion of the plurality of end users for the event;
storing the event registration messages in a registration list file, the event registration messages comprising at least identification information and preference information for each of the portion of the plurality of end users;
establishing a connection for the event for each of said portion of the plurality of end users via an interactive voice response (IVR) application based on the preference information for each of the portion of the plurality of end users; and
dropping the IVR application and maintaining the connection via a port on a network element to transfer the event data from the network element to said portion of the plurality of registered end users; and
transmitting a message to said at least a portion the plurality of end users to access a uniform resource locator (URL) link to access the event data at least one of during and after the event when a maximum number of ports are reached for a service capability of the network element used to share the event data with the end users.

* * * * *